Oct. 6, 1964  R. C. WHITEHEAD, JR  3,151,775
DENSITY APPARATUS

Filed April 18, 1961  5 Sheets-Sheet 1

INVENTOR.
ROBERT C. WHITEHEAD JR.
BY
ATTORNEY.

INVENTOR.
ROBERT C. WHITEHEAD JR.
BY Arthur H. Swanson
ATTORNEY.

Oct. 6, 1964

R. C. WHITEHEAD, JR 3,151,775

DENSITY APPARATUS

Filed April 18, 1961

INVENTOR.
ROBERT C. WHITEHEAD JR.
BY Arthur H. Swanson
ATTORNEY.

United States Patent Office 3,151,775
Patented Oct. 6, 1964

3,151,775
DENSITY APPARATUS
Robert C. Whitehead, Jr., Oreland, Pa., assignor to
Honeywell Inc., a corporation of Delaware
Filed Apr. 18, 1961, Ser. No. 103,941
17 Claims. (Cl. 222—57)

An object of the present invention is to provide an apparatus which will more accurately measure and control the density of a fluid mass within a flow container than has heretofore been disclosed in the prior density measuring art.

More specifically it is another object of the present invention to employ a plurality of dismountable sections to form a tube of a U-shaped configuration which tube is constructed to accommodate a continuous stream of fluid under pressure passing therethrough and which tube construction meets all of the rigid sanitary requirements of the International Association of Milk and Food Sanitarians, Inc.

Another object of the present invention is to provide a dismountable tube of the aforementioned type which has a pair of flexible braid-covered flexible tube couplings through one of which a continuous flow of fluid can be delivered to one leg portion of the aforementioned U-tube and through the other leg portion of which the fluid can flow out of and away from the interior of the tube, which couplings and U-shaped tube sections are so constructed that they can be readily cleaned in place or in other words readily cleaned by flushing.

It is another object of the present invention to provide the aforementioned coupling with a criss-cross flexible braid fixedly clamped at its end portions to associated end portions of the flexible coupling tubes so that the force-applying effect of axial and internal static pressures which are applied by the fluid passing through the tube will negate one another by allowing the criss-cross braid to stretch and thereby eliminate the undesired tube balooning and tube elongation effect which has heretofore been inherent in prior art densitiy measuring devices, even when pressures within the tube exceed one hundred and fifty pounds per square inch.

More specifically it is one of the major objects of the present invention to obviate the need for the cross-spring pivots and counterweights required for fluid-weighing tubes of prior art devices by selectively supporting the weight of such a tube structure at a point along the structure where the center of gravity of the fluid contents per se that is passing through the tube is located and by purposefully making the location of the center of gravity of the material forming the U-tube structure per se agree with the point where the center of gravity of the fluid per se is located.

It is another object of the invention to provide a sanitary U-shaped tube and associated coupling of the aforementioned described type in combination with a pressure transmitter on which this U-tube structure can be supported which supporting arrangement will enable the tube to be more rapidly assembled and disassembled for cleaning and repair than prior art devices which heretofore have been required to employ cross-spring connections and bulky counterweights.

More specifically it is another object of the present invention to employ a transmitter of the aforementioned type to indicate the density of a flow of fluid passing through a U-tube and to transmit a signal which is proportional to this density to a control valve located in a second fluid supply line so that a regulated amount of this second fluid, which can be either air or a liquid, can be mixed with the first-mentioned fluid passing into the U-tube and thus enable the density of the resulting fluid mixtures to be maintained at a predetermined constant value.

In packaging many fluids, such as sherbets and ice cream, manufacturers are, by law, required to precisely maintain the net weight of e.g. the sherbet or ice cream that is being fed into each of the empty cartons located at their filling stations at a value that is equal to or greater than, but never less than, a predetermined weight. Because present day process control practices have not heretofore been able to control the mixture of air and a preselected flavor or mixture of either sherbets or ice creams to the precise weight required by law it has become necessary for these manufacturers to provide an additional three or four ounces per half-gallon beyond that required by law in order to assure themselves that they fully comply with the legal weight requirement. Therefore the control techniques used by process manufacturers in feeding fluids, such as sherbet and ice cream, into empty cartons located at their filling stations have not been economically feasible because of this extra non-required weight loss which is referred to in the trade as "overrun."

It is a primary object of the present invention to provide a control system of the type previously described which because of its precise control action will enable manufacturers engaged in the manufacturing and packaging of fluids such as minced solids, slurry liquid mixtures, semi-frozen sherbet, ice cream or food mixtures such as cake mixes to maintain the density of such a fluid as it is fed into each carton at a filling station at a constant value so that the weight of the fluid placed in each carton will be maintained substantially identical to that required by law, thereby, eliminating the unnecessary costly overpacking loss or derogatory overrun problem referred to supra.

It is another object of the present invention to provide a tri-gradient spring pressure compensator for the aforementioned density measuring and density control system to maintain the density of the sherbet, ice cream or any of the other aforementioned fluids within a U-shaped tube at a prescribed value even under a condition in which changes in back pressure of the air and this fluid mix occur within the U-tube by having the compensator apply a force to the transmitter which force exactly nullifies the undesired additional force that is applied to the transmitter when a change in U-tube weight due to changes in this back pressure occur, thereby, making it unnecessary to alter the air pressure being supplied to the fluid in the U-tube by the transmitter during a condition in which these back pressure changes are taking place.

Further it is another object of the present invention to control the amount of air that is added to the ice cream as it is flowing through an ice cream manufacturing process so as to enable the ice cream produced by this process to have a preselected high quality in which the body of this ice cream is neither too heavy nor too light and its palatable texture is neither too cold and soggy nor frothy and snowy.

It is another object of the invention to provide a tri-gradient spring pressure compensator of the aforementioned type which possesses a spring force applying charactistic that is identical to that which is exemplified by changes in the weight of a fluid passing through a U-tube, under a condition in which changes in back pressure acting on the fluid in the tube occur due to: the temperature of the U-shaped conduit and/or a change in the speed of filling taking place at the filling station and/or a change in viscosity of the fluid passing through the U-tube resulting from the chilling of this tube.

Another object of the present invention is to provide a temperature compensator for the aforementioned control system to eliminate the non-linearity effect that a change in temperature of a process fluid would otherwise have on such an apparatus.

More specifically it is another object of the present invention to employ a transmitting and controlling apparatus to continuously measure and control the density of a flow of fluid passing through a U-tube and thence to atmospheric pressure to a preselected density of measuring the weight of a non-suppressed out weight portion of the fluid in the tube and sending a signal to a control valve so that a second fluid whose flow is being controlled by this valve can flow into the U-tube at a regulated rate which will maintain the fluid mixture passing through the tube at a prescribed weight as the aforementioned pressure and temperature changes take place.

Figure 1:
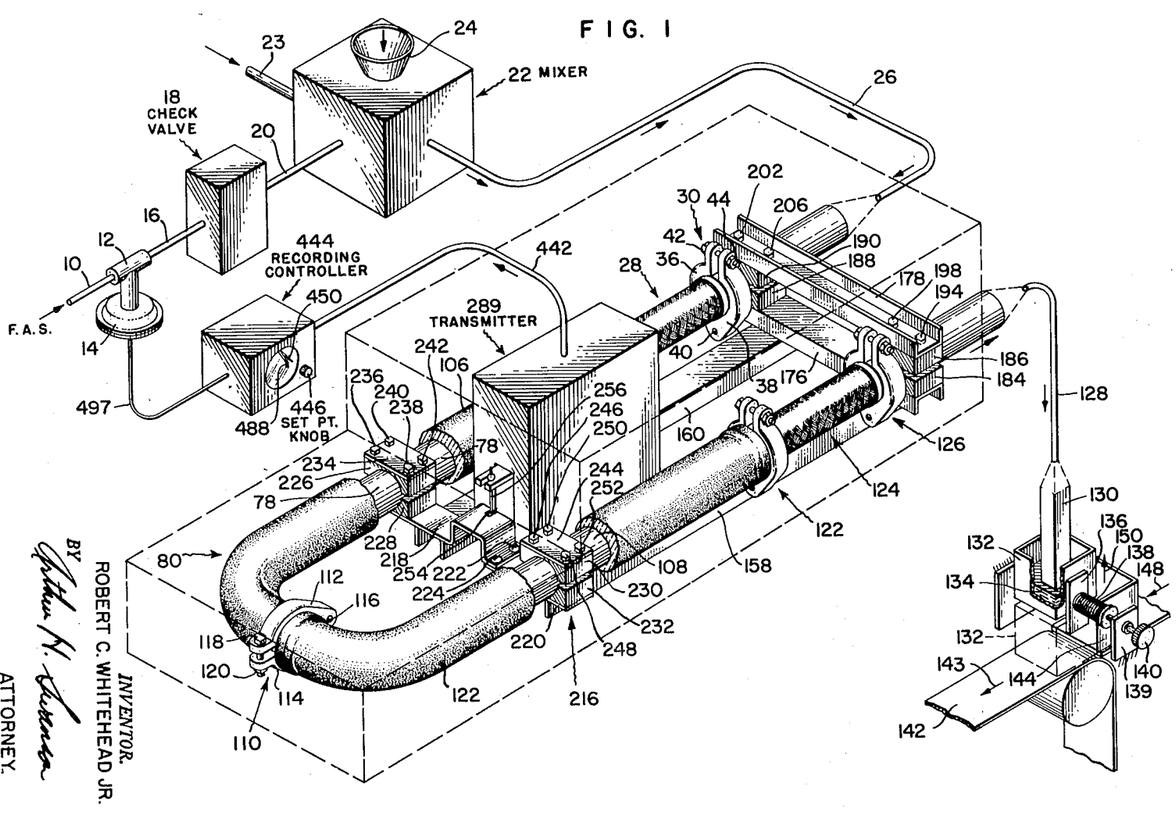
FIG. 1 shows a density measuring and controlling apparatus employed to regulate the density of a fluid to a substantially constant value as it flows from a fluid mixing chamber to a filling station.

The apparatus shown by way of example of FIG. 1, although useful in measuring and controlling the density of many different fluids, is herein illustrated as being made use of in an ice cream manufacturing process to maintain the density of the ice cream being produced by this process at a predetermined density.

The apparatus shown in FIG. 1 comprises a conduit 10 open at one end to an adjustably fixed filtered air supply F.A.S. and connected to a horizontal end of a T fitting 12 of a control valve 14. A conduit 16 is connected to the other horizontal end of the T fitting 12 at one end and is connected to a check valve 18 at its other end. Another conduit 20 is shown connected to an outlet pressure side of the check valve 18 at one end and connected to an air pressure inlet side of a mixer 22 at its other end which is generally of a continuous mixing rather than intermittent mixing type.

The mixer 22 has an inlet conduit 23 through which an air and ice cream mix flows in the direction of the arrow from an ice cream freezer not shown into the mixer 22.

In using existing present day commercially available ice cream freeezers the aforementioned mix would contain a substantial major portion of the air that is to be introduced into the ice cream. Hence only a small percent of the air in the ice cream will be introduced by way of the fixed regulated F.A.S. line 10 into the mixer 22. However it should be understood that with certain other fluids to which air is added it may be advantageous to control the major portion of the air that is introduced into these fluids rather than controlling only the small percent of this air that is being sent to the mixing chamber 22 as was noted supra.

A fluid inlet funnel-shaped member 24 is shown located at the top of the mixer to receive fruit or nuts. A conduit 26 is shown connected to an outlet of the mixer 22 at one of its ends and to the right end of a flexible braided tube assembly 28 by means of a sanitary stainless steel fitting 30.

Figure 2:
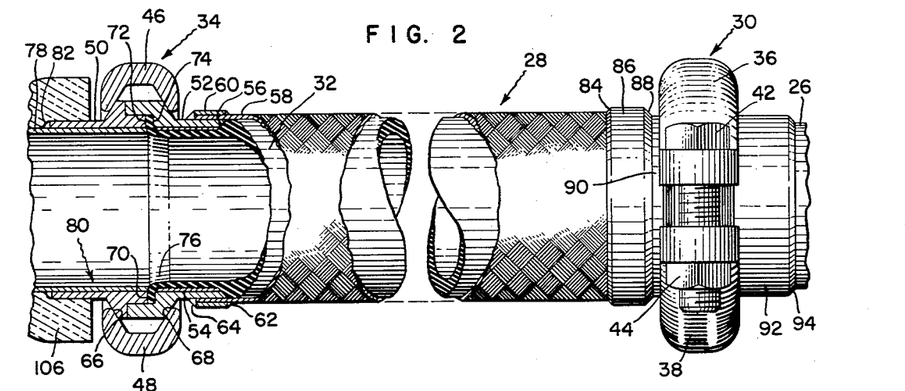
FIG. 2 shows in detail one form of a braided tube coupling which is shown schematically in FIG. 1.

The component parts of this braided tube assembly 28 is shown in FIG. 2 and is comprised of a tube 32 made of an approved sanitary material preferably white Neoprene. While white Neoprene is used it should be understood that other materials such as Teflon, Tygon, and rubber tubes may be used where such tubes are employed to measure fluids other than those with which the dairy industry manufacturers are concerned.

Located at the left end of the tube 32 is another stainless steel fitting 34 that is identical to fitting 30. The fitting 30 is formed of two curved segments 36, 38 that are pivotally mounted on a pin 40 at one end and which are shown fixedly connected at their other ends by means of a bolt 42 and nut 44. The two curved segments 46, 48 of the fitting 34 are shown in FIG. 2 in a clamped condition against the sides of the ring coupling members 50, 52. A circular metal ring liner 54 is fixedly connected by a swaging process to the inner wall surface of the coupling member 52 and has an outer cylindrical wall thereof in surface-to-surface contact with the outer surface of flexible tube 32.

The right end portion of the coupling member 52 is shown chamfered and in mating surface-to-surface contact at 56 with a similarly mating chamfered outer peripheral ring portion of the flexible tube 32.

A metal braid 58 tradenamed "TITE-FLEX" is shown in surface-to-surface contact with an outer peripheral wall surface of the coupling member 52.

As shown in FIG. 2 a metal ring 60 surrounds an end portion of the braid 58. The ring 60 is shown braised along its entire right circumferential end by braising material 62 to the metal braid 58. The left end of this ring 60 is braised along its circumference by braising material 64 to the outer peripheral surface of coupling member 52.

The curved segments 46, 58 of fitting 34 are shown in FIG. 2 in tight wedged coupling engagement with the coupling members 50, 52 at the mating surfaces 66, 68.

When the fitting 34 is placed in the coupled position the molded flange 70 forming a circumferential end portion of the flexible tube 32 will then be in a preselected slightly compressed sealing engagement with the inner circumferential end surfaces 72, 74 of the coupling members 50, 52.

FIG. 2 of the drawing shows how the dimension of the inner wall portion 76 at the end of a flexible tube 32 is made of a gradually increasing diameter. Such an arrangement as is shown in FIG. 2 of the drawing permits the inner wall of the tube 32 adjacent the extreme left end of this tube to be made approximately the same inside diameter as the end of the left leg portion 78 of a U-tube assembly 80 with which it is shown in engagement and thus provides an acceptable sanitary connection that meets the rigid sanitary requirements of the International Association of Milk and Food Sanitarians, Inc.

The coupling member 50 is shown attached to an outer peripheral wall surface of the leg portion 78 by means of a braising material 82.

The right end of FIG. 2 shows the outer peripheral surface of the braided tube 28 connected by braising material 84 to a metal ring 86 in a manner identical to that described supra for the braising material 62 which connects the metal braid 58 to the metal ring 60.

The right end of the metal ring 86 and end of the braid 58 is connected by way of braising material 88 to a coupling member 90 in the same manner as the left end of the ring 60 and the left end of the braid 58 is braised at 64 to its associated coupling member 52. Although not shown in the drawing the right end of the flexible tube 56 is formed into a flange that is identical to that shown at the left end of the tube shown in FIG. 2. The flange located at the right end of flexible tube 32 is retained in place by the coupling members 90, 92 which members are identical to the coupling members 52, 50 shown in cross-section at the left end of the flexible tube 32.

Located within the right end of the coupling 90 there is a circular metal ring liner which, although not shown in the drawing is identical to the liner 54 shown at the left end of the flexible tube 32.

The right end of the coupling member 92 is connected by braising material 94 to the conduit 26.

Figure 3:
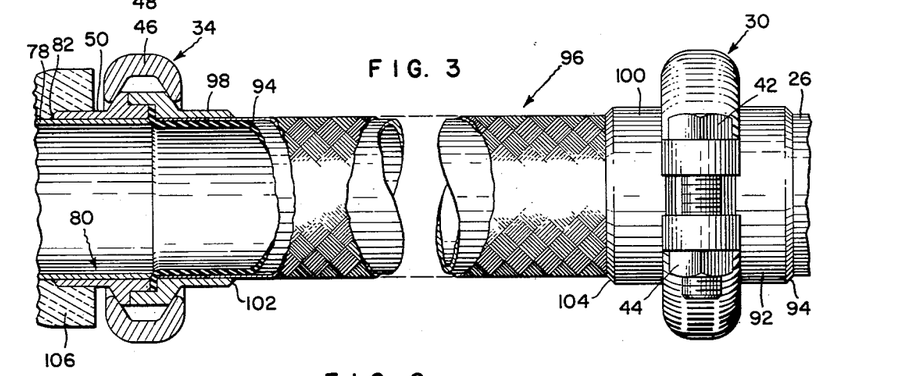
FIG. 3 shows in detail another modified form of a braided tube coupling from that disclosed in FIG. 2.

FIG. 3 shows a modified braided tube assembly and couplings which can be substituted for the form of tube and coupling arrangement shown in FIGS. 1 and 2. This FIG. 3 showing while similar to that shown in FIGS. 1 and 2 differs from the flexible tube 94 in that it has a uniform thickness throughout its entire length and because the ends of the braided tube assembly 96 is connected internally rather than being externally connected to the stainless steel coupling members 98, 100. As shown in FIG. 3 the member 98 is connected by a braising material 102 at its right end to the external surface of the braid 94 and the coupling member 100 is shown connected by means of a braising material 104 at its left end to the braid 94.

The coupling part 92 is connected by braising at 94 to the conduit 26 and the other coupling part 50 is connected by braising at 82 to the left leg 78 of the U-tube assembly 80 in the same manner as that disclosed in FIG. 2. The parts of the stainless steel fitting as shown in FIG. 3 are constructed so that they have the same identical characteristics as those represented by these reference numerals in FIG. 2.

In FIG. 1 an insulating material 106 is shown surrounding the left leg portion 78 of the U-shaped tube 80. The end of portion 78 that forms the base of the U-tube 80 is shown connected to a right leg tube portion 108 of the U-tube 80 by means of a stainless steel fitting 110. This stainless steel fitting 110 contains two curved segments 112, 114 which are pivotally mounted at one end with respect to one another on a pin 116. The other end of this member contains a bolt 118 and nut 120. This fitting 110 is similar to that shown at the right end of FIG. 2 for the fitting 30. While not shown in detail in FIG. 1 the internal parts of this fitting 110 contain two coupling parts similar to the coupling parts 50, 52 shown at the left end of FIG. 2 except that a gasket is employed between these parts in lieu of the flange 70 of the tube 32.

Another length of insulating material 122 which may be made of a suitable foam rubber material, such as a material tradenamed Armaflex "22," is shown in FIG. 1 covering the right leg portion 108 of the U-shaped tube 80. The upper end of the straight portion of this tube 108 is shown connected by means of a stainless steel fitting 122 to the flexible tube 124. The braided flexible tube 124, the stainless steel fittings 122, 126 and the coupling parts contained therein are made identical to the braided flexible tube 28, the stainless steel fittings 34, 30 and their associated coupling parts 50, 52; 90, 92 shown in FIG. 2 of the drawing. The only difference is that the right end of the braided flexible tube 124 is connected to one end of the conduit 128 in lieu of the conduit 26. It should be understood that the U-tube hereinafter referred to refers to the tube parts identified in FIGS. 1 and 2 of the drawing as 78, 108 and one half of the length of the flexible members 28 and 124.

The other end 130 of this conduit 128 of a rectangular-shaped configuration so that it will match but be slightly smaller than the carton 132 as shown. The rectangular end 130 is open to atmosphere and is shown feeding ice cream 134 into the bottom portion of the ice cream carton 132.

The carton 132 is schematically shown supported by one or more spring loading side plates 136 and a spring loading mechanism 138 which is shown adjustably connected to a stationary part 139 by means of a screw adjusting means 140, and a spring loading plate movable therewith.

The dotted line outline for the carton 132 shows the position that the carton will be in when it has just been filled to a preselected volume and is in a position to be carried away from the ice cream filling station by the conveyor belt 142 in the direction of the arrow 143.

Reference numeral 144 indicates the position that the next incoming empty carton will occupy just before the filled carton 132 is carried away by the conveyor belt 142 and the carton 144 is placed by a feeding box mechanism, not shown, in the position presently occupied by carton 132 that is shown in solid line form.

It can thus be seen that the top of the ice cream carton 132 when moved in the direction of the arrow 146 along the conveyor belt will cut-off at a precise volume the continuous flow of ice cream flowing from the ice cream filling pipe 130. While this filling operation is taking place it can also be seen that the empty carton will simultaneously be moved sequentially in the direction of the arrows 148, 150 into the previously-mentioned ice cream filling position now being occupied by the carton 132 that is shown in solid line form.

Figure 4:
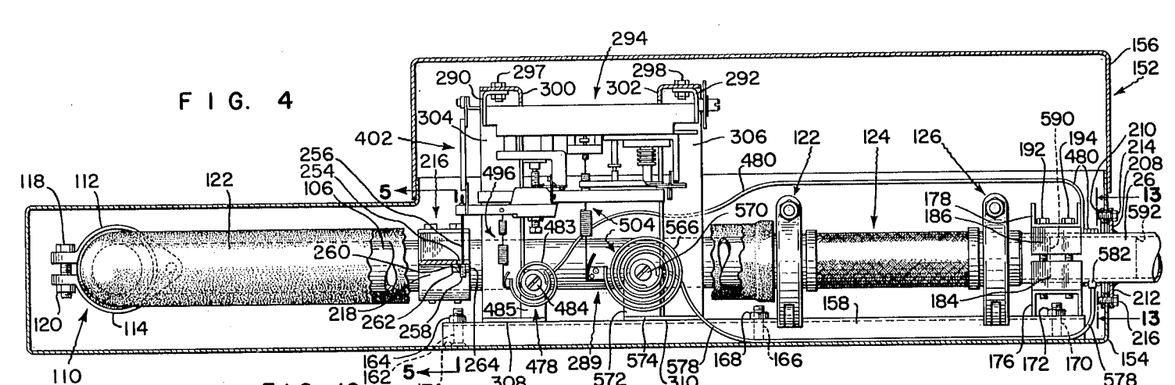
FIG. 4 shows a detailed front sectional elevation of the density measuring and controlling apparatus shown in FIG. 1.

FIG. 4 also shows an enclosure 152 which is comprised of a lower housing 154 and a removable upper housing 156. Each one of the two channel support members 158, 160 shown in FIGS. 1 and 4 are fixedly connected to the base of the lower housing 154 by means of a suitable stud and nut connection 162, 164; 166, 168; 170, 172 in the manner shown in FIG. 4 of the drawing. Each of these studs are welded by welding material at their lower ends such as is shown at 174 for the bolt 162.

The ends of the conduits 26 and 128 are connected by means of two channel members 176, 178. The lower end of the channel 176 is welded with welding material to the top of the support member 158.

Suitable Plexiglas blocks 184, 186; 188, 190 are provided with inside curved surfaces which surround the respective conduits 128 and 26. Four bolts 192, 194, 196; as shown in FIGS. 1 and 4 and two additional bolts, not shown, pass through the channel members 178 blocks 186, 180 and channel member 176 to threadedly connect the upper block 186, 184 in tight engagement with the conduit 128. Four other similar bolts 202, 206 as shown in FIG. 1 and two additional bolts, not shown, pass through channel member 178 blocks 190, 188 and channel member 176 to threadedly connect the blocks 188, 190 in tight engagement with the conduit 126.

One end of the conduit 128 is shown passing through an aperture formed by the housing wall surface 208. A metal ring 210 is shown in FIG. 4 as being fixedly connected to and extending about the inner end wall of the lower housing 154 that contains the aperture therein. The flange 212 is shown in FIG. 4 as being fixedly connected to the conduit 128. Tap bolts 214, 216 are shown threadedly engaged with the casing 154 and metal ring 210 so that the flange 212 is held in tight surface-to-surface engagement with the lower casing 154. Although not shown in the drawing it should be understood that a similar connection is intended to be used for the end of the conduit 26 that passes through the lower casing 154.

Figure 5:
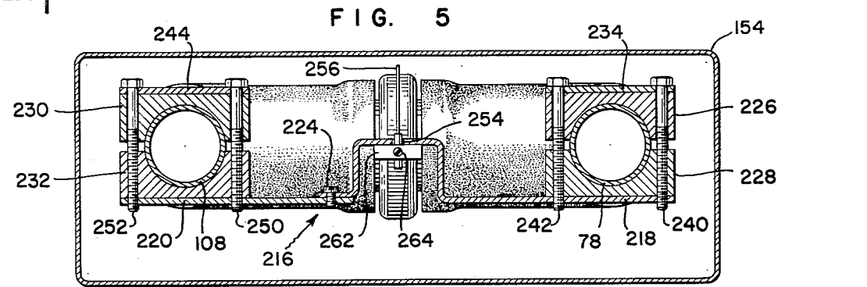
FIG. 5 shows a sectional view taken along section 5—5 of FIG. 4.

As shown in FIGS. 1, 4 and 5 the left and right leg portions of the end of the U-tube 80 are connected by means of a saddle 216. This saddle is comprised of a first plate 218, a second plate 220 joined by means of the screws 222, 224 to the first plate 218 and four saddle blocks 226, 228, 230, 232 made of a Plexiglas material. This saddle is also comprised of a first stop plate 234 through which tap bolts 236, 238, 240 and 242 pass so that these bolts when tightened will retain the blocks 226, 228 in tight engagement with the conduit 78 as shown in FIG. 5. This saddle is also comprised of a second top plate 244 through which the tap bolts 246, 248, 250, 252 pass so that these bolts when tightened will retain blocks 230, 232 in tight engagement with the conduit 108.

A wall surface of the plate 218 is shown in FIGS. 1, 4 and 5 as forming a slotted out portion 254 for passage of a flexible elongated connection 256 therethrough. FIG. 4 of the drawing shows the lower end of this flexible elongated member 256 passing through and connected by swaging to a sleeve 258 having an outer serrated surface. This serrated sleeve 258 is shown passing through a wall forming an opening 260 of a pad 262 that integral with the plate 218. A set screw 264 is employed as shown to engage the right side surface of the sleeve 258 and to thereby maintain the left side surface of this sleeve in fixed engagement with the left side surface of the wall forming the opening 260.

Figure 6:
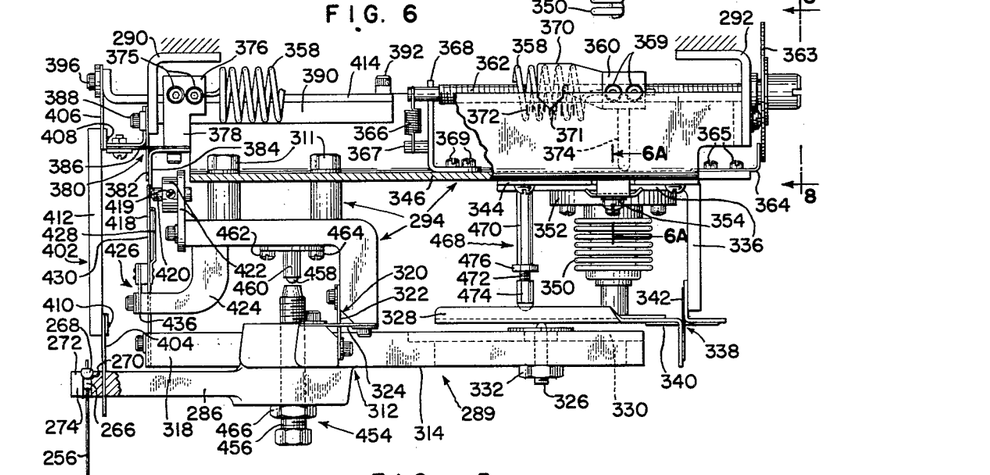
FIG. 6 shows a detailed front elevation of the transmitter used in the density measuring and controlling apparatus shown in FIGS. 1 and 4.
Figure 7:
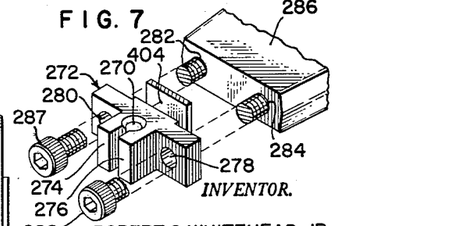
FIG. 7 shows an exploded view of an extreme lower left end portion of FIG. 6.

As is best shown in FIGS. 6 and 7 of the drawing the upper end of the flexible elongated member 256 has a sleeve member 266 swaged theron whose upper end is of a partial spherical-shaped configuration 268. The lower end of the spherical-shaped portion 268 of the sleeve member 266 is shown positioned in a grooved-out wall portion 270 of a cross-shaped member 272 which wall portion is of a partial spherical counter-sunk shape configuration.

As can best be seen in FIG. 7 the walls 274, 276 of the cross-shaped member 272 form a slot through which the lower end of the sleeve member 266 can be moved so that its peripheral-shaped portion 268 can be slid into or out of a surface-to-surface contact position with a mating wall portion 270.

A first pair of clearance holes are shown at 278, 280 in cross-shaped member 272 and a second pair of tapped holes are shown at 282, 284 in a rigid horizontal arm 286 of the transmitter 289 to accommodate the bolts 287, 288 threadedly connected thereto.

The transmitter 289 is of a general type similar to that disclosed in the Stokes et al. Patent 2,823,688 which produces an output pneumatic signal proportional to a temperature that it is measuring. It should be noted that certain structural changes have been made in order that it could be employed to measure the magnitude of weight changes resulting from changes in the density of a fluid passing through a U-tube rather than employing it to measure the magnitude of a temperature being sensed by a thermal-filled system.

The transmitter 289 illustrated by way of example in the drawings, is shown in an inverted position comprises a supporting frame work of instrument chassis 294 at the top of the transmitter and a main beam 312, which is pivotally connected intermediately of its ends to said frame work.

The frame parts 290, 292 of transmitter instrument chassis 294 are in turn supported in the aforementioned inverted position by means of a suitable number of bolt and nut connections as shown at 297, 298 to the horizontally positioned plate members 300, 302 at the upper end of two vertically mounted support brackets 304, 306. The brackets 304, 306 are respectively shown fixedly connected at their lower ends by means of welding material at 308, 310 to the top of channel support member 158.

Although not shown in FIG. 4 of the drawing it should be understood that two additional vertically mounted support brackets mounted at their lower ends on channel support member 160, similar to the support brackets 304, 306 could be employed if desired to provide additional overhead support for the instrument chassis 294 by extending the bracket 300 to the top of one of these additional vertically mounted support brackets and by extending the bracket 302 to the top of the other additional support bracket so that the brackets 300 and 302 can be fixedly connected thereto. The part of the instrument chassis 294 shown in FIG. 6 immediately below the sectioned portion of same is fixedly connected as shown by means of tap bolts 311.

As shown, the beam 312 is formed with three substantially rigid horizontal arms, 314, 286 and 318, and is pivotally connected to a portion of the frame work 294 by a pair of cross spring type pivots 320. Each of the cross spring pivots 320 comprises a vertical strip 322 and a horizontal strip 324. The lower end of strip 322 is connected to the beam 312 and the upper end of the strip 322 is connected to the frame work 294. One end of the strip 324 is connected to the beam 312 and the other end is connected to the frame work 294.

The strips 322 and 324 are ordinarily so disposed that the midpoint of one edge of the strip 322 engages or is in close proximity to the mid-point of the adjacent edge of the strip 324. The arm 314 extends to the right and the arms 286 and 318 extend to the left of the pivot 320. The arm 286 is located at a lower level than the arm 318.

The arm 286 is subjected to a downwardly acting force by means responsive to the measured or controlling variable. In the embodiment of the invention illustrated, the controlling variable is a fluid weight contained in the U-tube.

Figure 6A:
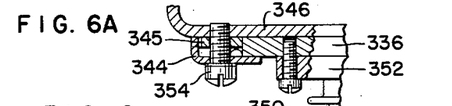
FIG. 6A shows a partial left half sectional view along section 6A—6A of FIG. 6.

The beam arm 314 extends to the right as seen in FIG. 6 and carries an adjustable pin 326 in contact with a rebalancing beam 328. The pin 326 extends through a longitudinal slot 330 in the beam 314, and may be clamped by a nut 332 in any position along the slot into which it may be adjusted. The beam 328 is pivotally connected to a frame portion or section 336 by a cross spring type pivot 338 similar in form to the pivot 320. This is comprised of spring strips 340 and 342, and has its pivot axis transverse to the length of the beams 312 and 328. FIGS. 6 and 6A show the angle-shaped frame portion 336 supported by a bearing plate clip 344 mounted on a flat horizontal wall portion 346 of the instrument chassis 294.

As best can be seen in FIGS. 6 and 6A the frame section 336 is arranged for longitudinal adjustment along the top of plate 344 and is shown slidable along the inner edge of stationary elongated plate 345. The beam 328 is subjected to a downwardly acting force by a rebalancing or follow-up bellows element 350 mounted on the removable frame work section 352. As is hereinafter explained, fluid under pressure in the bellows 350 subjects the rebalancing beam 328 to a force tending to turn the beam 328 counterclockwise as seen in FIG. 6. The secondary beam 328, frame section 336, bellows 350, form a convenient and effective unit cooperating with the pin 326 to adjust or regulate the application of the rebalancing or follow-up force to the main beam 312. This rebalancing unit may be bodily detached from the frame work 294 for inspection and repair by loosening of the screw 354 shown in FIG. 6A of the drawing and another similar bearing plate clip retaining screw unit not shown, which has its centerline located the same distance away from the vertical center line of the bellows 350 as that shown for the screw 354. The purpose and operating effect of the bellows 350 is hereinafter more fully explained.

Figure 8:
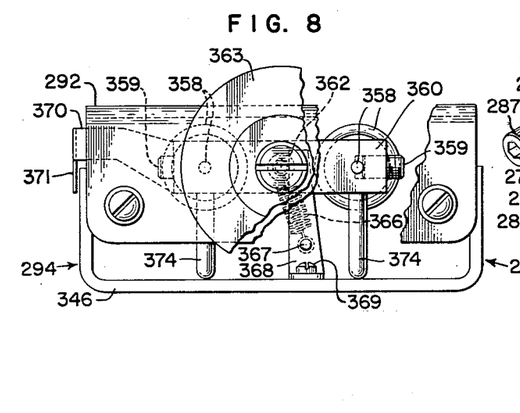
FIG. 8 is a partial sectional view taken along line 8—8 of FIG. 6.

The suppression system, which is an important feature of the instrument, comprises two parallel, elongated, horizontal, suppression springs 358 shown as generally parallel to the beams 312 and 328. The right ends of the springs 358, as shown in FIG. 8, are each anchored by means of the set screws 359 in a transverse abutment bar of cross-head 360 which is normally stationary, but may be adjusted in the direction of the lengths of the springs 358 by a rotatable zero adjusting device in the form of a long screw 362. The screw 362 is loosely journalled in a transverse vertical portion 292 of the stationary frame 294, and this screw carries and rotates a dial 363 cooperating with a stationary index element 364. As shown in FIGS. 6 and 8 this index element 364 is in turn fixedly connected by screws 365 to plate 346, to indicate the angular adjustment position of the screw 362. One end of a spring 366 is attached to the other end of the screw 362 and another end of this spring is connected to a pin 367 that extends from a stationary support 368. The support in turn is fixedly connected by means of screws 369 to the stationary frame portion 346 of the chassis 294. As shown, the abutment member 360 is provided with an arm 370, including an index 371 moving along a scale 372 carried by the portion 346 of the frame 294. The frame portion 346 is in the form of an inverted trough with a flat lower wall which is engaged by the lower ends of uprising post or guide elements 374 respectively associated with the two springs 358. Each element 374 has its upper end anchored in the cross-head 360. The flat lower wall of the body portion of the frame 294 cooperates with the parts 374 to prevent each spring 358 from rotating about the axis of the screw element 362.

The left ends of the springs 358, as seen in FIG. 6 are each connected by means of set screws 375 similar to the previously mentioned screw connection 359, to an upper portion 376 of a lever member or moment arm 378 pivoted to turn about the axis of a pivot 380. This pivot is of the cross spring type comprising two vertical spring strips 382 each having its lower end connected similar to the one shown, to a lower portion 384 of the abutment member 378 and each having its upper portion connected similar to the one shown to the vertical side of a detachable, but normally stationary, portion 290 of the stationary frame 294. Each of the horizontal spring strips 386 of the pivot 380 has one end connected similar to the one shown to the portion 384 of the member 378 and has its second end portion similar to the one shown connected to the upper side of the frame part 290. As shown in FIG. 6 the frame part 290 is detachably connected to the main stationary frame part 294 by screws 388. The member 378 has a generally horizontal lower arm or projection 390 made of a very high expandable alloy. Connected to one end of section 390 there is secured by means of the screw connection 392, a non-expansible metal strip made of e.g. an Invar material. The other end of the strip is connected by means of a screw connection 396 to a flexible strap 402 which in turn is connected to beam 312.

The strap 402 is comprised of two thin stainless steel strips 404, 406, welded by spot welding material at 408 and 410 to a central stainless steel portion 412. This novel construction prevents the flexible strap from expanding faster than the remaining parts of the instrument under a rapid substantial change in ambient temperature. In operation, the beam 312 is subjected to a clockwise torque about its pivot 320 by the tension of the springs 358. The ambient temperature compensating element 414 increases or decreases this torque by varying the moment arm of member 378 as the element 414 deflects in response to changes in the ambient temperature.

The free or left hand end of the arm 318, as seen in FIG. 6 supports a depending flapper 418. The flapper 418 is movable toward and away from the discharge end of a horizontal nozzle 420, which is mounted in a supporting nozzle block 422 shown fixedly attached to the left hand side of the frame structure 294. The nozzle member 420 is externally and slidably received in a horizontal socket formed in the block 422. The axially adjusted position of the nozzle 420 is important so that the latter may be secured in any desired adjustment position by adjusting a set screw 419 threaded into the block 422. The block 294 supports an uprising arm portion 424 having a horizontal portion which supports a guide 426 loosely surrounding an intermediate portion of the flapper valve 418. As shown, a flexible strip 430 of the guide member 426 protrudes upwardly from the lower end of the arm 424. Another upwardly protruding arm 428 having its upper end connected to the guide 426 has its upper end normally in engagement with the side of the flapper valve 418 adjacent the block 422, at a level slightly below the nozzle 420. With the described arrangement, the free end of the arm 318 is normally in or below its horizontal position shown in FIG. 6. With the arm 318 in its horizontal position, the upper end of the flapper 418 is at a minimum distance from the nozzle 420. The extent of that minimum distance may be adjusted by moving the nozzle 420 in its slidable socket 422. When the beam arm 318 is moved upward from or downward toward its horizontal position, the guide 426 causes the upper end of the flapper valve to move respectively away from or toward the nozzle 420.

In normal operation, the instrument shown in the drawings operates on the force balance principle to maintain the beam 312 in a position which varies from one end to the other of the span for which the instrument is adjusted, as the resultant of the forces acting on said beam varies between the minimum and maximum values for said span. Each of the various forces acting on the beam tend to turn the beam about the axis of its pivot 320 only in the clockwise, or only in the counter-clockwise direction, as seen in FIG. 6. Some of those forces act upwardly, while others act downwardly on the beam, and some of the forces act on the portion of the beam 312 at one side of the pivot 320, while others act on the portion of the beam at the other side of said pivot. As shown, one of the forces which tend to turn the beam clockwise, as seen in FIGS. 4 and 6, comprises the force transmitted to the beam 312 by the pivoted coiled spring 358 suppression system that has the lever member 378, connected to the beam arm 286 by the member 414 and link 402. Another of these forces comprises the force transmitted to the beam by the bellows 350 acting on the beam arm 314 through the secondary lever 328 and pin 326. The forces tending to turn the beam 312 counter-clockwise about pivot 320, as seen in FIGS. 4 and 6, comprise the weight of the U-tube 80 acting through flexible cable and ball connection 256, 268.

In practice, the maximum normal displacement of the beam 312 from an intermediate position in its range of movement, may be that required to effect a maximum movement of the flapper 418 toward and away from the nozzle 420. That movement is minute and ordinarily is about one one-thousandth of an inch. The ultimate purpose of the apparatus is to maintain a pneumatic transmission pressure which varies in predetermined proportion with the fluid pressure maintained in the bleed nozzle 420, and may well be four times the nozzle pressure. In ordinary practice, the transmission or controlled pressure system, shown diagrammatically in FIG. 9, comprises a detection unit including the flapper 418, nozzle 420, nozzle block 422, a manifold 436, a pilot valve 438, and the follow-up or rebalancing bellows 350 and associated conduits.

Figure 9:
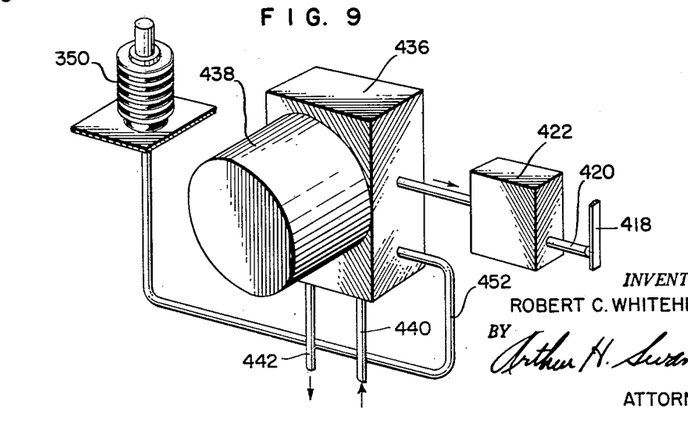
FIG. 9 shows a diagram illustrating how certain of the component parts of the transmitter shown in FIG. 6 are connected to one another to produce an output control signal.

The manifold 436 shown diagrammatically in FIG. 9 is a chambered body containing a plurality of channels or conduits in communication with different portions of the chambered pilot valve 438, and through which the latter is connected to different elements of the system as shown. The pilot valve 438 may be of a well-known non-bleed type such, for example, as that shown in U.S. Patent 2,445,255 of G. S. Younkin. Through channels in the manifold 436, the pilot valve 438 receives air under a suitable constant pressure, which may well be of the order of twenty pounds per square inch, through a pipe 440 from an unshown compressed air supply source.

The pilot valve 438 comprises a pressure chamber in which air received from the supply 440 is utilized in maintaining a control and transmission pressure which depends directly on the pressure in the bleed nozzle 420 and is in predetermined proportion to that pressure, and is ultimately dependent on, and proportional to the weight of the fluid in the tube. As shown in FIGS. 9 and 1 the fluid pressure in the pilot valve pressure chamber is transmitted through a conduit 442 to a conventional circular chart recording two mode controller 444 with proportional band and reset having a control point adjusting knob 446, a pen 448 and control point indicating arm 450. This fluid pressure from the pilot valve pressure chamber is also transmitted by way of conduit 442 through a pipe 452 to the follow-up or rebalancing bellows 350 directly as shown in FIG. 9.

The improved pneumatic transmitting apparatus is characterized in particular by its separate and effective zero and span adjustment provisions. In practice, the zero adjustment must be a calibrated adjustment, and the zero operating point of the instrument should be suitably indicated on the instrument. Each zero adjustment is effected by moving the cross-head or abutment member 360 of the suppression spring system to the right or left, respectively, as seen in FIG. 1, to thereby decrease or increase the tension of the suppression springs 358. As has been explained, the cross-head 360 is given its adjusting movements by the rotation of the threaded member 362 which is journalled in the frame work 294 and is in threaded engagement with the abutment 360. The rotation of the member 362 in one direction or the other elongates or shortens the springs 358, and thus, respectively, raises or lowers the zero point of the instrument.

A coarse adjustment of the cross-head 360 and resultant zero point adjustment is indicated by the position of the index 371 along the scale marks 372 carried by the instrument frame work 294, as shown in FIG. 6, the pointer 370 being carried by the free end of the arm 370 attached to the cross-head 360. A fine zero point adjustment is indicated by the angular position of a rotatable dial 363 relative to a stationary index 364. The latter is carried by the frame work 294. The zero point position of the cross-head 360 corresponds to the low weight end of the scale.

The span range depends on the interaction of main beam 312 and the secondary beam 328. The span adjustment provisions in this pneumatic transmitter 289 are like the zero point adjustment provisions in that they comprise means for effecting a coarse span adjustment and means for effecting a fine span adjustment. The coarse span adjustment is effected by adjusting the position along the length of the slot 330 in the beam 312 in which the pin 326 is clamped to said beam. The fine span adjustment is effected by sliding the frame section 336 along the surface 344 in the longitudinal direction of the beam 328 toward or away from the pivot 320 as shown in FIG. 6 and then tightening the screws 354. Each of the described coarse and fine span adjustments modifies the leverage with which the follow-up or rebalancing pressure in the bellows 350 is applied to the beam 312. That leverage is increased and decreased by adjustment of the pin 326 in the slot 330 respectively away from and toward the pivot 320. That leverage is also increased and decreased by respective adjustments of the member 336 toward and away from the pivot 320. An increase in said leverage decreases the length of the measurement span and a decrease in the leverage elongates that span.

Two large sources of gradient are the flapper assembly and the suppression system. To suitably reduce the flapper assembly gradient, use is made of the thinnest possible spring material and the parts shown are suitably proportioned.

The suppression system gradient is kept small by making each of the tension springs 358 of a helix configuration having a great many turns. The use of a large number of turns is made practically feasible by mounting the elongated springs 358 alongside the main beam 312 so that the length of each spring may be comparable with the length of the beam 312.

As will be apparent, the matter of compensation for ambient temperature changes, is of prime importance in the operation of the transmitter 289. Optimum compensation results are obtained partly by minimizing the need for such compensation, and partly by improvements in the means utilized for effecting compensation. As previously explained, this transmitter substantially eliminates the need for compensation as a result of variations in the modulus of elasticity of the suppression spring system by making the springs 358 of a metal having a modulus of elasticity practically independent of the temperature of said material.

The means for effecting compensation have been improved by connecting the flapper 418 to one end of the main rebalancing beam 312 and by using a compensator 414 as a connector between the beam and the lever member 378 through which the springs 358 are connected to the beam. By suitably regulating the leverage in the mechanical connection between the main beam and the tension springs 358, it is possible to use springs 358 of such small weight that the relatively high cost of the Ni-Span-C material will be desirably small.

In FIG. 6 there is shown an over-travel unit 454. This unit is comprised of a screw member 456 threadedly mounted as shown in a position on the primary beam 312 so that its upper end is spaced a slight distance from the underside of the rotatable sphere 458, when the transmitter is in the operating position shown in FIG. 6. The sphere 458 is schematically shown retained for rotation in the lower end of a T-shaped member 460 that is fixedly connected to the instrument chassis 294 by means of screw connections 462, 464. A nut 466 is threadedly mounted on the screw 456 so that after the upper end of the screw has been placed in the operating position shown it will be possible to lock this screw in this position by holding the head thereof and rotating the nut 466 along the axis of the screw until it is brought into tight engagement with the underside surface of the beam part 286. Such an arrangement protects strap 402 and the flapper 418 against being overloaded by a person applying an undesired manual force in an upward direction to the underside of the beam 286 under a condition in which the flexible connection 256 has been disengaged from the primary beam part 286.

FIG. 6 also shows a stop mechanism 468 comprised of a first hexagonal bar 470 having a hollow tapped-out central portion, not shown. The upper end of this bar 470 is fixedly mounted to the stationary chassis part 346 and the lower inner central portion of same is shown threadedly engaged by screw member 472. The lower end of this screw member 472 is shown made of a hexagonal bar-shaped configuration 474 that terminates in a hemispherical tip at its lowermost end. A nut 476 is shown threadedly mounted for movement along the screw member 472. By loosening this nut 476 the hexagonal bar 474 can then be rotated in a clockwise or counter-clockwise direction along the screw member 472 to move the lowermost tip of the hexagonal bar 474 to a desired preset position with respect to the beam 328.

Temperature Compensating Unit

Normally the temperature of a fluid such as ice cream remains substantially constant while it is being manufactured and no temperature compensation is required.

Figures 10, 14:
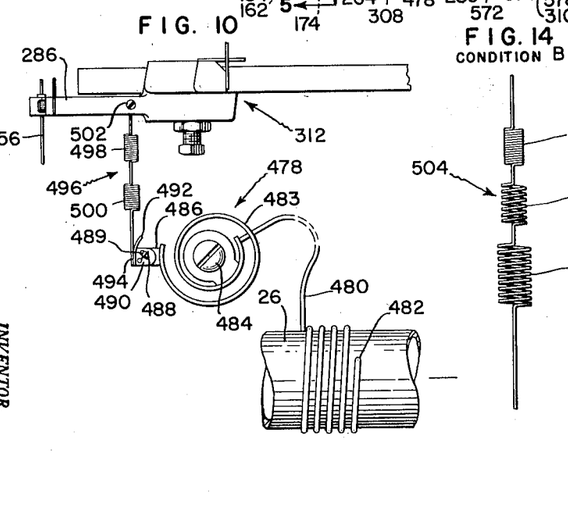
FIG. 10 shows a temperature compensator unit.
FIG. 14 shows the same tri-spring arrangement as that shown in FIG. 12 but under a condition in which two coiled portions of this spring are activated.

FIG. 10 of the drawing shows how a temperature compensator 478 can be connected to the aforementioned transmitter 289 to eliminate the non-linear effect that a change in temperature of fluids other than ice cream would otherwise have on the density control apparatus. This compensator is comprised of a mercury or gas-filled capillary tube 480 snugly wrapped about the conduit 26 and being connected at one of its ends by braising material 482. The other end of this capillary 480 is shown connected to an adjustably fixed end of either an associated mercury or gas-filled spiral 483 that is of a conventional construction. The spiral 483 is fixedly connected by means of a screw 484 to a stationary support member 485 as shown in FIG. 4 of the drawing. A lug 486 having a threaded stud 488 protruding therefrom is shown fixedly connected to the movable end of the spiral 483. A second lug 490 having a slot therein is shown in FIG. 10 of the drawing in surface-to-surface engagement with the lug 486 for accommodating the passage of the stud 483 therethrough. A wing nut 489 is shown in threaded engagement with the stud 488 to retain the two lugs 486, 490 in a desired angular relationship as shown. A curved lip part 492 is shown integral with the lug 490 and being connected by braising material 494 to the lower end of a two rate spring 496 having an upper and lower coil 498, 500. The upper end of this spring 496 is in turn shown fixedly connected by means of a set screw 502 to the beam part 286.

It can thus be seen that the spiral 483 of the aforementioned temperature compensating unit 478 will act to apply force in a downward direction through the medium of the two rate springs 496 to the part 286 of the beam 312 upon an increase in temperature of the fluid passing from the mixer through the inlet conduit 26 and to the U-tube 80.

It can also be seen that upon a decrease in temperature of the temperature of the process fluid being sensed by the fill fluid in the aforementioned capillary 480 that the force being applied to the part 286 of the beam 312 through the two rate springs 496 will be decreased.

This two rate spring arrangement 496 thus affords a way of increasing or decreasing the force on the beam 286 as shown in FIG. 10 by an amount which exactly counteracts the respective increase or decrease in the force applied to the beam 286 by the U-tube when a decrease or increase in the temperature of the fluid from a preselected value occurs in the U-tube. The weight of the U-tube will decrease with an increase in temperature, since the fluid in the U-tube will expand and a portion of this fluid will be expelled as a result of this temperature change and thus the weight of the fluid sample in the U-tube is reduced.

It can thus be seen that the aforementioned temperature changes in the fluid to not therefore effect the magnitude of the output signal of the transmitter 289.

The gradient or spring force transmitting characteristics selected for the springs 498, 500 are such that they will cancel out any non-linear relationship which exists between the density-temperature relation of the continuously flowing ice cream.

Ice Cream Pressure Compensating Unit

Figure 11:
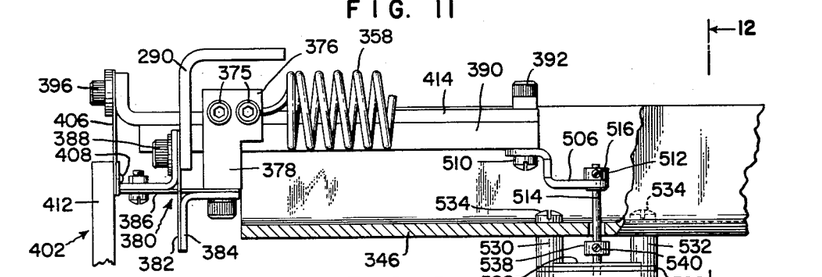
FIG. 11 is a partial sectional view of the upper left end portion of the transmitter shown in FIG. 6 and further shows a dashpot unit which forms a part of this transmitter's tri-spring pressure compensation unit.
Figures 12, 16:
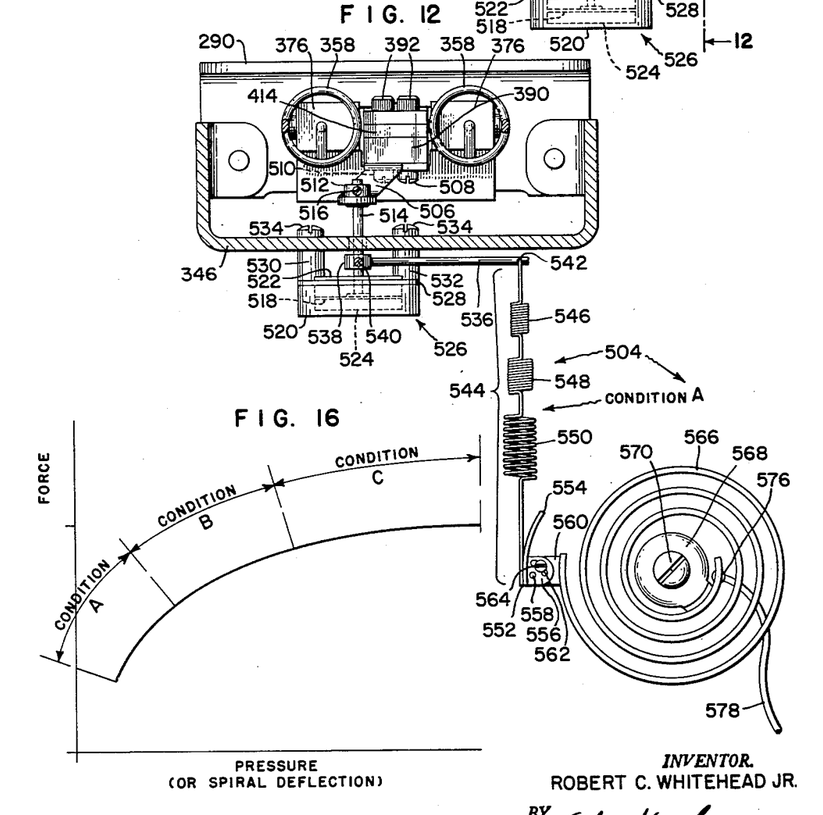
FIG. 12 is a view of transmitter taken along the lines 12—12 of FIG. 11 and shows in addition thereto the tri-spring compensating unit having one of its coiled portions activated and connected to the aforementioned dashpot unit.
FIG. 16 is a chart which shows the linearizing effect that the tri-spring pressure compensating unit has on the density measuring and control apparatus.

An ice cream pressure compensating unit 504 is shown in FIGS. 4, 11, and 12 of the drawing. This unit 504 is comprised of a bracket 506 fixedly connected by the screw connections 508, 510 to projection part 390. In FIGS. 11 and 12 a sleeve 512 is shown integral with the lower end of the bracket 506. Passing through the center of the sleeve 512 there is a piston rod 514 that is fixedly connected to this sleeve by means of the set screw 516.

FIGS. 11 and 12 show a piston in the form of a disc 518 integrally connected to the other end of the piston rod 514. A cup-shaped member 520 provided with a top cover plate 522 is also shown in FIGS. 11 and 12 of the drawing. A fluid 524 is retained within the walls of the cup-shaped member 520. A displaceable piston 518 is also shown within the walls of the cup-shaped member 522 in order to provide a dashpot unit 526 for dampening out any abnormally sudden changes in force being applied in a downward direction to the primary beam part 286 and the flexible strip 402. The dashpot unit 526 is also provided with a gasket 528 and a pair of support sleeves 530, 532. A pair of supporting tap screws 534 are shown passing through the gasket 528 and the sleeves 530, 532 and are threadedly connected to the side wall forming the cup 520.

A rod 536 is shown having a sleeve 538 integral with one end of this rod and being fixedly connected by means of a set screw 540 to the piston rod 514. The other end of the rod 536 is shown having a wall 542 forming an aperture therein to receive the upper end of a tri-spring unit 544 having three coils 546, 548, 550 which are each of a different diameter. The lower end of this tri-spring arrangement is shown fixedly connected at 552 to a lip portion 554 of a lug member 556. This lug member 556 contains a pivot pin 558 which is shown protruding through an aperture in a second lug member 560 so as to provide a rotatable connection between these two lug members 556, 560. The lug member 556 contains a wall member forming a slot 562 through which a screw 564 passes and is threadedly connected to the lug 560.

The screw and slot connection 562, 564 provide a means by which the lip and lug 556 can be pivoted about the pivot pin 558 to a position other than the one shown and fixed in this new position by tightening screw 564.

The lug 560 is shown integral with a movable end of a pressure spiral 566. The opposite inner end of this spiral is fixedly connected to a mounting plate 568 which in turn is shown in FIG. 4 as being mounted by means of a screw connection 570 on a stationary support member 572. The base of this support member 572 is welded at 574 to the channel support member 158.

Figures 13, 15:
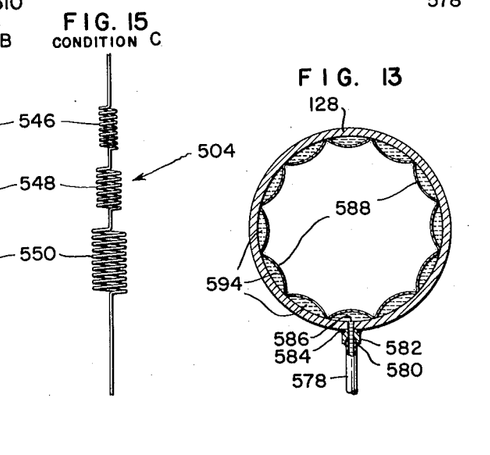
FIG. 13 is a section taken along the lines 13—13 of FIG. 4 and shows a pressure sensor for the tri-spring pressure compensating unit shown in FIG. 12.
FIG. 15 shows the same tri-spring arrangement as that shown in FIG. 12 but under a condition in which all three coiled portions of the spring are activated.

The inner inactive end of the spiral 556 has a portion connected by means of a solder material 576 to one end of a capillary 578. The other end of this capillary 578 is shown in FIGS. 4 and 13 of the drawing connected by welding material 580 to a sleeve 582 which sleeve in turn is welded by welding material 584 to the outer periphery of conduit 128. The wall 586 forms a passageway through the wall of the conduit 128. This passageway 586 is shown located substantially midway between the end portions of a flexible corrugated inner tube member 588 that is in turn nicro-braised to the inner wall of the conduit 128 along the cylindrical end surfaces 590 and 592 shown at the right end of FIG. 4.

The type of flexible seal 588 is the same type of flexible seal as that disclosed in the Taylor et al. patent application Serial No. 42,670, filed July 13, 1960.

A non-compressible fluid 594 such as glycerin and water fills the space between the flexible corrugated tube 588 and the inner wall of the conduit 128, the passageway 586, the inner surface of sleeve 582, capillary 578 and spiral 566.

In the operation of the tri-spring ice cream pressure compensating unit it can be seen that when an initial increase in the magnitude of the back pressure occurs in the air of the ice cream mix flowing through the inside of the flexible tube 588 to the tube 128, the flexible corrugated tube 588 will be expanded outwardly towards the inner wall of the conduit 128. This action compresses the compressible filling fluid 594 and causes it to flow out of the chamber formed by the flexible wall 588, conduit 128 and thence through the passageway 586 sleeve 582, capillary 578 to expand the spiral 566 and to pull spring 550 in a downward expanded direction as shown in FIG. 12 of the drawing.

This spiral deflecting condition is indicated as condition A in FIG. 16 of the drawing or a condition in which an initial desired increasing non-linear force is being applied through rod 536, piston rod 514, bracket 506, arm 390, made of an expandable alloy, ambient temperature compensated elements 414, 402 to the primary beam part 286.

As a further increase in the magnitude of the fluid pressure takes place within the flexible pressure sensing tube 588 shown in FIGS. 4 and 13 the spiral 566 will be deflected along the line identified as condition B in FIG. 16 of the drawing. Under this condition the spring 548 and 550 will be forced to expand due to the downward force of the spiral 566 exerted on same to the position shown in FIG. 14. It can thus be seen that under this condition B an increasing force will be applied by way of the ambient temperature compensated element 402 to the beam part 286 in the desired non-linear manner shown in FIG. 16 of the drawing as the pressure within the flexible tube 588 is increased.

Upon further increase in pressure within the pressure sensing tube 588 the third spring 546 will be expanded until it reaches the upper right end of the pressure level range indicated as condition C on the chart shown in FIG. 16. Under this condition all three springs 546, 548 and 550 will have been forced to expand due to the downward force of the spiral exerted on same to the position as shown in FIG. 15.

It can thus be seen that under this condition C that an additional force of increasing magnitude will be applied in the aforementioned manner by way of the ambient temperature compensated element 402 to the beam part 286 as the pressure within the flexible tube 588 is increased in the desired non-linear manner shown in FIG. 16 of the drawing.

As the ice cream flows out of the U-tube by way of conduit 128 to atmospheric pressure and variations in the back pressure of the air in the U-tube 80, conduit 26 and its associated braided tubes 28, 124 takes place, the aforementioned tri-spring pressure compensator 504 will cause a non-linear force to be applied to the primary beam part 286 in a direction which will cancel out the change in weight effect which the change in back pressure has on the weight of the fluid in the U-tube 80 and in one half length of each of the braided tubes 28, 124 that are connected to the ends of the U-tube. The selection of the gradient for each of the respective springs 546, 548 and 555 is such that as the spiral applies a force to the lower end of these springs the resulting magnitude of output force which these springs will apply through the ambient temperature compensating means 402 in an upward direction to the primary beam part 286 will exactly equal the force being applied in a downward direction at any instant of time to the beam due to increases in weight of the U-tube that are caused by increases in the back pressure of the air in the U-tube 80 and in each half lengths of the flexible tubes 28, 124 referred to supra.

It can thus be seen that a novel way has been devised to nullify the detrimental density measuring error effect that the feeding of a continuous flow of ice cream to atmospheric pressure has heretofore had on prior art density measuring devices.

It should be understood that this pressure compensating unit 504 has been found useful in measuring and controlling the density of mixtures other than the aforementioned described spongy ice cream—air mixture.

For example the employment of the aforementioned pressure compensating apparatus would be useful in providing an accurate measurement and control of the density of slurries containing air. It would also be very beneficial to employ the previously mentioned temperature compensating unit for such an air-slurry mixture to eliminate any error arising from changes occurring in the temperature of the slurry mixture from a preselected temperature level.

The transmitter 289 is characterized by the ease and accuracy with which the measurement range, measuring span, and effective zero point of this transmitter can be fixed and separately adjusted. The attainment of a desirably high sensitivity requires the measuring span to be a relatively small portion of the maximum measuring range, and the transmitter thus requires a relatively wide and accurate suppression range. In practice, the measuring range of this transmitter may well vary from for example fluid weight in the U-tube of zero pounds to a total fluid weight in the U-tube of twenty-one pounds. The fluid referred to being that fluid which is within the U-tube 80 and in one half length of each of its associated flexible tube portions 28, 124. This transmitter 289 may be adjusted for operation through a measuring span, which may be a small span of six ounces or a large span of forty-eight ounces, in any portion of the total range of twenty-one pounds. Moreover, no change in the transmitter parts are required in adjusting the transmitter for operation in any span mentioned above. In practice, the transmitting apparatus may be made accurate to within one half of one percent of the span, up to a span value of forty-eight ounces.

For the attainment of the operating results desired, gradients in the transmitter are much higher than are customary in pneumatic instruments. For this reason, the apparatus must be designed to keep the deflections of its beam and lever elements to a minimum under the normal changes. The mechanical amplification in the detection system or portion of the apparatus may be about 45:1, and with a pilot valve having the usual 4:1 output-input pressure ratio required, the theoretical movement of the U-tube, including one half of the flexible tubes connected thereto, to changes in the fluid weight may be less than one hundred millionths of an inch. The high gradients and high motion sensitivity required thus makes the differential expansion a very serious problem. The gravity of that problem is augmented, moreover, by the relatively high suppression ratio, since error in the suppression system must be multiplied by the high suppression ratio in determining the error on a full scale percent basis. Resultant specific problems are the determination of the compensation required, and the maintenance of the compensation at its bare minimum value. In practice, such maintenance is obtained by making all parts of materials having the same coefficients of expansion.

Under practical operating conditions, another serious difficulty may result from changes in the modulus of elasticity as the temperature of the apparatus varies. This problem is especially serious in the suppression system and particularly in the suppression spring or springs. This difficulty is eliminated, or suitably minimized, by the use of material such as the alloy known as "Ni-Span-C," having a modulus of elasticity which is not varied to any appreciable extent by temperature changes.

As shown in FIG. 1 a conduit 497 having one end connected to the output portion of the recording controller 444 and its other end connected to the head of the valve 14 is employed to transmit an output fluid pressure control signal from the recording controller 444 to the valve 14. The fluid pressure level that this control signal will take at any instant of time, as ice cream is being continuously passed through the U-tube 80, will be equal to the difference in the magnitude of the pressure level of the fluid being sent to the recording controller from the transmitter 289 and the pressure level of a second manually regulated fluid pressure whose pressure level depends on the position to which the density control point knob 446 is set for any given color and brand of ice cream.

From the aforementioned description it can be seen that an apparatus has been disclosed herein which has the following advantages:

(1) It provides an improved density measuring and controlling apparatus which affords a more precise and accurate way of increasing and/or decreasing the specific amount of a fluid, such as air, that is required to be added to a continuous flow of a second fluid such as ice cream passing into one end and out another end of a tube by way of a braided tube structure to atmospheric pressure without allowing changes occurring in the temperature or the back pressure of the fluid mixture in the U-tube from adversely effecting the performance of the density measuring and controlling apparatus.

(2) This apparatus provides for accurate measurement and control, of the density of a fluid to a fixed value as it flows into, through and out of a completely sanitary U-shaped weighing tube structure that is supported from a pneumatic transmitter solely at a point location on the tube structure where the center of gravity of the tube per se and the center of gravity of the fluid per se in the weighing tube structure are coincident with one another, thereby, eliminating the need of undesired friction introducing flexure pivots and counter-weights that have heretofore been required.

(3) The construction of the U-shaped weighing tube used in this density measuring and controlling apparatus is unique in that a first pair of associated ends of each of the flexible coupling tubes and braided sleeve covering used for these tubes are fixedly connected to their associated open end portions of the U-tube and the remaining ends of each of these flexible tubes and braided sleeves are fixedly connected to their associated stationary inlet or outlet filling tubes to thereby provide not only a flexible tube coupling for the U-tube that meets all the sanitary requirements of the dairy and food products industry but also provides a tube structure that is not subject to undesired radial or longitudinal expansion.

(4) The apparatus has a built-in tri-spring, back pressure compensating unit to enable the density of the fluid flowing through this tube and connections therewith to be always kept at a precise, preselected fixed density level thus preventing back pressure changes from adversely effecting the weight of the tube and thence the control of the density of the fluid within the tube, and (5) Since this apparatus can control the fluid flowing through the U-tube to such a precise preselected fixed value the fluid flow passing from the U-tube through the open end of a filling pipe into a carton can more easily be cut-off at a precise weight, thus eliminating the required costly carton overfilling or overrun that has heretofore been required.

What is claimed is:

1. An apparatus to maintain the density of a flowing mixture containing a first and second fluid under pressure at a preselected value, comprising a deflectable conduit having an inlet and atmospheric exhaust port to accommodate the flow of the fluids therethrough, a force balanced pneumatic transmitter having a deflectable horizontally positioned force balancing weighing beam, a support plate connected to said deflectable conduit, a dismountable elongated flexible member connected at one end to an end of the beam and being connected at its other end to the conduit support plate at a point that is coincident with the center of gravity of the flowing mixture passing through the deflectable conduit and the center of gravity of the material per se forming the deflectable conduit and the conduit support plate, said transmitter being further comprised of a spring means connected to said beam to apply a force thereto that is equal and opposite to that being applied by the conduit, the conduit support plate and a portion of said mixture flowing through the conduit, a pneumatic controller, said transmitter being operably connected to continuously apply an input signal to said controller whose magnitude is directly proportional to changes in force acting on the beam as the weight of the remaining portion of said flowing mixture is altered, said pneumatic recording controller being operably connected to instantaneously respond to the magnitude of the input signal and the magnitude of a fixedly adjusted set point pressure signal to produce an output pressure control signal that is proportional to the difference between said last-mentioned signals, means to apply said last-mentioned control signal to a control valve in a flow line connected to the inlet of said conduit to regulate the flow of the first fluid passing therethrough to thereby continuously maintain the weight and density of the flowing mixture at said preselected value.

2. The apparatus for controlling the density of a flowing mixture to a preselected value as defined in claim 1 wherein a temperature compensating unit comprising a capillary tube and dual rate springs in series are operably connected to respond to changes occurring in the temperature of the mixture passing into said deflectable conduit to simultaneously apply a force to the beam in a direction which will exactly negate the change in the magnitude of force that changes in the temperature of the mixture in the deflectable conduit applies by way of said conduit and the flexible member to the beam, thereby enabling the control of the density of the flowing mixture to be effected at a preselected temperature condition.

3. An apparatus to maintain the density of a flowing fluid mixture containing more than one fluid under a varying pressure that is greater than atmospheric pressure at a preselected value as said fluid mixture flows through a mixing chamber to a flexibly mounted weighing tube that is open to atmospheric pressure, comprising a controller, a force balance transmitting means, a force-transmitting member extending between said force balance transmitting means and a portion of the weighing tube where the center of gravity of the tube and the center of gravity of the fluid in the tube are coincident to thereby transmit the weight of the tube and its contents in the form of an input force to said force balance transmitting means, said transmitting means being operably connected to transmit a force signal of increasing magnitude to the controller as the weight of the tube and the fluid mixture passing therethrough exceeds a preselected weight and to transmit a force signal of decreasing magnitude to said controller as the weight of the tube and fluid mixture passing therethrough is reduced to the preselected weight, a control valve for controlling the flow of a first one of the fluids used in the fluid mixture as it flows into said mixing chamber, the controller being operably connected to transmit a control signal to said control valve whose magnitude is equal to the difference in magnitude of the signal it receives from said transmitter and an adjustably fixed density set point signal to thereby regulate the rate of flow of the first fluid flowing therethrough in accordance with the magnitude of said control signal.

4. The density control apparatus as defined in claim 3 wherein the first one of said fluids is a compressible fluid and the magnitude of the signal received by the control valve being operable to regulate the pressure of the compressible fluid flowing therethrough.

5. The density control apparatus as defined in claim 3 wherein said first one of the fluids is compressed air and the magnitude of the signal received by the control valve being operable to regulate the pressure of the compressible fluid flowing therethrough.

6. The density control apparatus as defined in claim 3 wherein the flowing fluid mixture passing through the mixing chamber is comprised of aerated ice cream, the first one of the fluids is air under pressure and wherein a check valve in a flow conduit is employed at a location between the control valve and the mixing chamber to accommodate the flow of air under pressure.

7. In an apparatus for controlling the density of a flowing air-ice cream mixture, a continuously operated air-ice cream mixer, a first inlet port in said mixer to continuously receive a supply of an aerated ice cream mix, a first conduit opened at one end to an adjustably fixed air supply and connected at its other end to a second inlet port of said mixer, a check valve forming a portion of said conduit through which air from said adjustably fixed air supply flows through an open end of the conduit into said mixer, and an ice cream-air transmitting conduit connected at one end to an output port of the mixer and open to atmospheric pressure at its other end in combination with a non-flexible U-shaped tube forming a first portion of the ice cream transmitting conduit, two flexible sanitary tubes, each of said flexible tubes having a metal braided sleeve covering them and connected to their respective outer peripheral end wall surfaces, a first one of said flexible tubes having a first dismountable coupling to connect one of its ends in sealing engagement with a straight inlet leg portion of said U-tube, the other of said tubes having a second dismountable coupling to connect one of its ends in sealing engagement with another straight outlet leg portion of said U-tube, said first one of said flexible tubes having a third dismountable coupling to connect its other end in sealing engagement with an open end of a stationary portion of said transmitting conduit that is transmitting aerated ice cream from said mixer to said U-tube, the other of said flexible tubes having a fourth dismountable coupling to connect its other end in sealing engagement with a stationary input end of a portion of said transmitting conduit that is transmitting the aerated ice cream mix out its other end to atmospheric pressure at an ice cream filling station, a pneumatic transmitter supporting the U-tube and one-half length of the elongated flexible braided tubes connected thereto at a point that coincides with the center of gravity of the U-tube and the half elongated flexible braided tubes and the center of gravity of the mixture flowing through the U-tube and the aforementioned elongated halves of said flexible braided tubes, a controller, said controller being operably connected with the pneumatic force balance transmitter to receiver a pneumatic signal therefrom whose magnitude is proportional to changes taking place in the magnitude of the force being applied by the said U-tube and the half flexible braided tube portions to said transmitter and said controller being operably connected to transmit a pressure signal to a control valve that forms a portion of the conduit at a location between its regulated air supply end and said check valve to regulate the supply or air that is being transmitted to said mixer to maintain said flowing mixture at a preselected density.

8. An improvement in apparatus for weighing material having a flow tube structure that is of a U-shaped configuration for accommodating the passage of a material to be weighed therethrough, said improvement comprising means to weigh the tube and contents therein, and wherein said improvement further comprises a single, non-stretchable connecting means extending between a movable portion of the weighing means and the tube for transmitting changes in weight of the material in the tube to the weighing means, said connecting means being fixedly positioned at its tube end to support the combined weight of the tube and material contained therein at a point on the U-tube structure where the center of gravity of the tube and the center of gravity of the material passing therethrough are coincident with one another.

9. An apparatus to maintain the density of a flowing mixture containing a first and second fluid under pressure at a preselected value, comprising a deflectable conduit having an inlet and atmospheric exhaust port to accommodate the flow of the fluids therethrough, a force balanced pneumatic transmitter having a deflectable horizontally positioned force balancing weighing beam, a support plate connected to said deflectable conduit, a dismountable elongated flexible member connected at one end to an end of the beam and being connected at its other end to the conduit support plate at a point that is coincident with the center of gravity of the flowing mixture passing through the deflectable conduit and the center of gravity of the material per se forming the deflectable conduit and the conduit support plate, said transmitter being further comprised of a spring means connected to said beam to apply a force thereto that is equal and opposite to that being applied by the conduit, the conduit support plate and a portion of said mixture flowing through the conduit, a pneumatic controller, said transmitter being operably connected to continuously apply an input signal to said controller whose magnitude is directly proportional to changes in force acting on the beam as the weight of the remaining portion of said flowing mixture is altered, said pneumatic recording controller being operably connected to instantaneously respond to the magnitude of the input signal and the magnitude of a fixedly adjusted set point pressure signal to produce an output pressure control signal that is proportional to the difference between said last-mentioned signals, means to apply said last-mentioned control signal to a control valve in a flow line connected to the inlet of said conduit to regulate the flow of the first fluid passing therethrough to thereby continuously maintain the weight and density of the flowing mixture at said preselected value and wherein a pressure compensating unit is employed that is responsive to changes occurring in the back pressure of the mixture passing from said deflectable conduit through the atmospheric exhaust port to simultaneously apply a force to the beam in a direction which will exactly negate the change in the magnitude of force that changes in the back pressure in the deflectable conduit applies by way of said conduit and the flexible member to the beam.

10. An apparatus to maintain the density of a flowing mixture containing a first and second fluid under pressure at a preselected value, comprising a deflectable conduit having an inlet and atmospheric exhaust port to accommodate the flow of the fluids therethrough, a force balanced pneumatic transmitter having a deflectable horizontally positioned force balancing weighing beam, a support plate connected to said deflectable conduit, a dismountable elongated flexible member connected at one end to an end of the beam and being connected at its other end to the conduit support plate at a point that is concident with the center of gravity of the flowing mixture passing through the deflectable conduit and the center of gravity of the material per se forming the deflectable conduit and the conduit support plate, said transmitter being further comprised of a spring means connected to said beam to apply a force thereto that is equal and opposite to that being applied by the conduit, the conduit support plate and a portion of said mixture flowing through the conduit, a pneumatic controller, said transmitter being operably connected to continuously apply an input signal to said controller whose magnitude is directly proportional to changes in force acting on the beam as the weight of the remaining portion of said flowing mixture is altered, said pneumatic recording controller being operably connected to instantaneously respond to the magnitude of the input signal and the magnitude of a fixedly adjusted set point pressure signal to produce an output pressure control signal that is proportional to the difference between said last-mentioned signals, means to apply said last-mentioned control signal to a control valve in a flow line connected to the inlet of said conduit to regulate the flow of the first fluid passing therethrough to thereby continuously maintain the weight and density of the flowing mixture at said preselected value and wherein a pressure compensating unit is employed that is responsive to changes occurring in the back pressure of the mixture passing from said deflectable conduit through the atmospheric exhaust port to simultanetously apply a force to the beam in a direction which will exactly negate the change in the magnitude of force that changes in the back pressure of the mixture in the deflectable conduit applies by way of said conduit and the flexible member to the beam and wherein the compensating unit is comprised of a fluid filled flexible corrugated tube forming a sanitary sealed-off inner wall portion of said atmospheric exhaust port, a fluid-filled capillary tube forming a fluid pressure transmitting means between said outer peripheral wall of said corrugated tube and said inner wall of said exhaust port and a sealed fluid-filled actuating spiral, a plurality of springs of different spring gradient sequentially connected in series for motion with one another, one end of said series springs being connected to a movable end of the spiral and being connected at its other end to a damping means and a connecting linkage operably connected at one end to the damping means and being connected at its other end to the beam.

11. An apparatus to maintain the density of a flowing mixture containing a first and second fluid under pressure at a preselected value, comprising a deflectable conduit having an inlet and atmospheric exhaust port to accommodate the flow of the fluids therethrough, a force balanced pneumatic transmitter having a deflectable horizontally positioned force balancing weighing beam, a support plate connected to said deflectable conduit, a dismountable elongated flexible member connected at one end to an end of the beam and being connected at its other end to the conduit support plate at a point that is coincident with the center of gravity of the flowing mixture passing through the deflectable conduit and the center of gravity of the material per se forming the deflectable conduit and the conduit support plate, said transmitter being further comprised of a spring means connected to said beam to apply a force thereto that is equal and opposite to that being applied by the conduit, the conduit support plate and a portion of said mixture flowing through the conduit, a pneumatic controller, said transmitter being operably connected to continuously apply an input signal to said controller whose magnitude is directly proportional to changes in force acting on the beam as the weight of the remaining portion of said flowing mixture is altered, said pneumatic recording controller being operably connected to instantaneously respond to the magnitude of the input signal and the magnitude of a fixedly adjusted set point pressure signal to produce an output pressure control signal that is proportional to the difference between said last-mentioned signals, means to apply said last-mentioned control signal to a control valve in a flow line connected to the inlet of said conduit to regulate the flow of the first fluid passing therethrough to thereby continuously maintain the weight and density of the flowing mixture at said preselected value and wherein a pressure compensating unit is employed that is responsive to changes occurring in the back pressure of the mixture to simultaneously apply a force to the beam in a direction which will exactly negate the change in the magnitude of force that changes in the back pressure of the mixture applies by way of said conduit and the flexible member to the beam, thereby enabling the control of the density of the flowing mixture to be effected at a preselected atmospheric condition.

12. An apparatus to maintain the density of a flowing mixture containing a first and second fluid under pressure at a preselected value, comprising a deflectable conduit having an inlet and atmospheric exhaust port to accommodate the flow of the fluids therethrough, a force balanced pneumatic transmitter having a deflectable horizontally positioned force balancing weighing beam, a support plate connected to said deflectable conduit, a dismountable elongated flexible member connected at one end to an end of the beam and being connected at its other end to the conduit support plate at a point that is coincident with the center of gravity of the flowing mixture passing through the deflectable conduit and the center of gravity of the material per se forming the deflectable conduit and the conduit support plate, said transmitter being further comprised of a spring means connected to said beam to apply a force thereto that is equal and opposite to that being applied by the conduit, the conduit support plate and a portion of said mixture flowing through the conduit, a pneumatic controller, said transmitter being operably connected to continuously apply an input signal to said controller whose magnitude is directly proportional to changes in force acting on the beam as the weight of the remaining portion of said flowing mixture is altered, said pneumatic recording controller being operably connected to instantaneously respond to the magnitude of the input signal and the magnitude of a fixedly adjusted set point pressure signal to produce an output pressure control signal that is proportional to the difference between said last-mentioned signals, means to apply said last-mentioned control signal to a control valve in a flow line connected to the inlet of said conduit to regulate the flow of the first fluid passing therethrough to thereby continuously maintain the weight and density of the flowing mixture at said preselected value and wherein a temperature compensating unit is employed that is responsive to changes occurring in the temperature of the mixture to simultaneously apply a force to the beam in a direction which will exactly negate the change in magnitude of force that changes in the temperature of the mixture applies by way of said conduit and flexible member to the beam.

13. A sanitary, cleaned-in-place, weighing tube for use in measuring changes in the weight of food products passing therethrough, comprising a substantially non-resilient U-tube having a first and second dismountable section of a J-shaped configuration, a coupling member fixedly connected to and surrounding a straight end of each J-shaped section, two flexible tubes each having a flange at is opposite ends, one end surface of one of the flanges being on one of the flexible tubes being in abutting surface-to-surface contact with the straight end of one J-shaped section and the coupling associated therewith, and one end surface of the flange on the other end of the flexible tube being in similar contact with the other J-shaped section and the coupling associated therewith, a separate braided sleeve covering each of the outer peripheral portions of the flexible tubes, a coupling member fixedly connected to and surrounding the peripheral end surface of each of the braided sleeves to retain each flexible tube in a fixed dismountable position in its associated braided sleeve, each end of the curved portion of the J-shaped sections having a coupling member thereon, a gasket positioned between the last-mentioned member, the last-mentioned coupling members being fixedly clamped in fluid-tight engagement against opposite sides of the gasket by means of a detachable sanitary clamp, another detachable sanitary clamp positioned to retain the coupling member on one of the other ends of one of said sleeves and the end flange of the flexible tube retained therein in fluid-tight engagement with an end of a substantially non-resilient, stationary, food products, inlet, flow conduit that has a coupling member fixedly connected therewith, a detachable sanitary clamp to retain a coupling member positioned on the other of the braided sleeves and the end flange of the flexible tube retained therein in fluid-tight engagement with an end of a substantially non-resilient, stationary, food products, discharge flow conduit that is open to atmosphere and has a coupling member fixedly connected therewith, a weighing means and a single non-stretchable, force-transmitting, supporting connection between a movable portion of the weighing means and a point on the U-tube structure where the center of gravity of the tube structure and the center of gravity of the food product in the tube structure are coincident with one another.

14. The sanitary, cleaned-in-place, weighing tube as defined in claim 13, wherein the braided tube sleeve is of a preselected, criss-cross, stainless steel construction which is adapted to apply forces to the outer peripheral surface of the flexible tube to prevent radial and longitudinal exponsion of the flexible tube resulting from changes in the pressure of the food products passing through the flexible tube.

15. The sanitary, cleaned-in-place, weighing tube as defined in claim 13, wherein the wall thickness of the clamped end portions of each flexible tube and portions immediately adjacent thereto that extend through and inwardly of the end portions of the braided sleeve is of a smaller dimension than the wall thickness of the remaining wall portion of each of the flexible tubes.

16. The sanitary, cleaned-in-place, weighing tube as defined in claim 13, wherein each of the flexible tubes is constructed of a unitary, odorless, tasteless, non-toxic, sanitary material.

17. An apparatus to accurately measure changes in weight of a fluid passing through a flow tube comprising a substantially non-flexible U-shaped member, a stationary fluid inlet passageway, a first flexible section adapted to be inserted in fluid-tight engagement between an open end of the U-shaped member and the inlet passageway to form a part of the flow tube, a stationary fluid outlet passageway, a second flexible section adapted to be inserted in fluid-tight engagement between the remaining open end of the U-shaped member and the outlet passageway to form another part of the flow tube, each of the flexible sections being comprised of a separate resilient tube having a flange at each end thereof and a braided sleeve surrounding the flexible tube, each sleeve having non-flexible members at each end to retain the end flanges of each tube in physical surface-to-surface contact therewith, a weighing means, a force-transmitting flexible connection extending between the weighing means and a point connection on the flow tube where the center of gravity of the flow tube and the center of gravity of the fluid passing therethrough are coincident with one another.

References Cited in the file of this patent

UNITED STATES PATENTS

| | | |
|---|---|---|
| 779,398 | Calkins | Jan. 3, 1903 |
| 1,780,182 | Frederics | Nov. 4, 1930 |
| 2,147,353 | Scholtes | Feb. 14, 1939 |
| 2,510,158 | Van Ackeren | June 6, 1950 |
| 2,753,196 | Melsom | July 3, 1956 |
| 2,764,316 | Sylvest | Sept. 25, 1956 |
| 2,889,030 | Mottet | June 2, 1959 |
| 3,004,544 | Guptill | Oct. 17, 1961 |
| 3,018,120 | Vann | Jan. 23, 1962 |
| 3,039,310 | Copland et al. | June 19, 1962 |

FOREIGN PATENTS

| | | |
|---|---|---|
| 776,926 | Great Britain | June 12, 1957 |
| 810,400 | Great Britain | May 18, 1959 |